(12) United States Patent
Matejek et al.

(10) Patent No.: US 8,288,031 B1
(45) Date of Patent: Oct. 16, 2012

(54) BATTERY DISCONNECT UNIT AND METHOD OF ASSEMBLING THE BATTERY DISCONNECT UNIT

(75) Inventors: Bob Matejek, Oakland, MI (US); Mark Niedzwiecki, Troy, MI (US); Greg Phillips, White Lake, MI (US); Hee Kook Yang, Troy, MI (US); Bryan Symons, Westland, MI (US); Bob Merriman, Shelby Township, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/073,000

(22) Filed: Mar. 28, 2011

(51) Int. Cl.
*H01M 10/38* (2006.01)
*H02J 7/00* (2006.01)

(52) U.S. Cl. ........ 429/123; 429/156; 429/158; 429/160; 320/112; 320/119

(58) Field of Classification Search ................... 429/149, 429/150, 156, 158, 160, 175, 7, 123, 121; 320/107, 112, 113, 118, 119, 124, 125
See application file for complete search history.

(56) References Cited

U.S. PATENT DOCUMENTS

| | | |
|---|---|---|
| 2,273,244 A | 2/1942 | Ambruster |
| 3,503,558 A | 3/1970 | Galiulo et al. |
| 3,522,100 A | 7/1970 | Lindstrom |
| 4,390,841 A | 6/1983 | Martin et al. |
| 4,396,689 A | 8/1983 | Grimes et al. |
| 5,071,652 A | 12/1991 | Jones et al. |
| 5,270,131 A | 12/1993 | Diethelm et al. |
| 5,346,786 A | 9/1994 | Hodgetts |
| 5,354,630 A | 10/1994 | Earl et al. |
| 5,364,711 A | 11/1994 | Yamada et al. |
| 5,385,793 A | 1/1995 | Tiedemann et al. |
| 5,487,955 A | 1/1996 | Korall et al. |
| 5,487,958 A | 1/1996 | Tura |
| 5,510,203 A | 4/1996 | Hamada et al. |
| 5,520,976 A | 5/1996 | Giannetti et al. |
| 5,561,005 A | 10/1996 | Omaru et al. |
| 5,589,290 A | 12/1996 | Klink et al. |

(Continued)

FOREIGN PATENT DOCUMENTS

CN 1512518 A 7/2004

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner* — Raymond Alejandro
(74) *Attorney, Agent, or Firm* — Buckert Patent & Trademark Law Firm, PC

(57) ABSTRACT

A battery disconnect unit for selectively coupling a battery pack to a load is provided. The unit includes a base portion that holds first and second contactors, a pre-charging relay, and a charging relay, thereon. The unit further includes a circuit board having first, second, third and fourth bus bars disposed thereon. The first and second bus bars are coupled to first and second terminals, respectively, of the first contactor. The first bus bar is further coupled to the battery pack, and the second bus bar is further coupled to the load. The third and fourth bus bars are coupled to third and fourth terminals, respectively, of the second contactor. The third bus bar is further coupled to the battery pack, and the fourth bus bar is further coupled to the load.

13 Claims, 8 Drawing Sheets

U.S. PATENT DOCUMENTS

| | | | |
|---|---|---|---|
| 5,606,242 A | 2/1997 | Hull et al. |
| 5,652,502 A | 7/1997 | van Phuc et al. |
| 5,658,682 A | 8/1997 | Usuda et al. |
| 5,663,007 A | 9/1997 | Ikoma et al. |
| 5,693,432 A | 12/1997 | Matsumoto |
| 5,756,227 A | 5/1998 | Suzuki et al. |
| 5,796,239 A | 8/1998 | can Phuoc et al. |
| 5,825,155 A | 10/1998 | Ito et al. |
| 5,982,403 A | 11/1999 | Inagaki |
| 6,016,047 A | 1/2000 | Notten et al. |
| 6,099,986 A | 8/2000 | Gauthier et al. |
| 6,117,584 A | 9/2000 | Hoffman et al. |
| 6,121,752 A | 9/2000 | Kitahara et al. |
| 6,257,328 B1 | 7/2001 | Fujiwara et al. |
| 6,353,815 B1 | 3/2002 | Vilim et al. |
| 6,362,598 B2 | 3/2002 | Laig-Horstebrock et al. |
| 6,406,812 B1 | 6/2002 | Dreulle et al. |
| 6,413,678 B1 | 7/2002 | Hamamoto et al. |
| 6,422,027 B1 | 7/2002 | Coates, Jr. et al. |
| 6,441,586 B1 | 8/2002 | Tate, Jr. et al. |
| 6,448,741 B1 | 9/2002 | Inui et al. |
| 6,462,949 B1 | 10/2002 | Parish, IV et al. |
| 6,475,659 B1 | 11/2002 | Heimer |
| 6,515,454 B2 | 2/2003 | Schoch |
| 6,534,954 B1 | 3/2003 | Plett |
| 6,563,318 B2 | 5/2003 | Kawakami et al. |
| 6,709,783 B2 | 3/2004 | Ogata et al. |
| 6,724,172 B2 | 4/2004 | Koo |
| 6,771,502 B2 | 8/2004 | Getz, Jr. et al. |
| 6,780,538 B2 | 8/2004 | Hamada et al. |
| 6,821,671 B2 | 11/2004 | Hinton et al. |
| 6,829,562 B2 | 12/2004 | Sarfert |
| 6,832,171 B2 | 12/2004 | Barsoukov et al. |
| 6,876,175 B2 | 4/2005 | Schoch |
| 6,886,249 B2 | 5/2005 | Smalc |
| 6,892,148 B2 | 5/2005 | Barsoukov et al. |
| 6,927,554 B2 | 8/2005 | Tate, Jr. et al. |
| 6,943,528 B2 | 9/2005 | Schoch |
| 6,967,466 B2 | 11/2005 | Koch |
| 6,982,131 B1 | 1/2006 | Hamada et al. |
| 7,012,434 B2 | 3/2006 | Koch |
| 7,026,073 B2 | 4/2006 | Ueda et al. |
| 7,039,534 B1 | 5/2006 | Ryno et al. |
| 7,061,246 B2 | 6/2006 | Dougherty et al. |
| 7,072,871 B1 | 7/2006 | Tinnemeyer |
| 7,074,517 B2 | 7/2006 | Higashino |
| 7,098,665 B2 | 8/2006 | Laig-Hoerstebrock |
| 7,109,685 B2 | 9/2006 | Tate, Jr. et al. |
| 7,126,312 B2 | 10/2006 | Moore |
| 7,147,045 B2 | 12/2006 | Quisenberry et al. |
| 7,197,487 B2 | 3/2007 | Hansen et al. |
| 7,199,557 B2 | 4/2007 | Anbuky et al. |
| 7,229,327 B2 | 6/2007 | Zhao et al. |
| 7,250,741 B2 | 7/2007 | Koo et al. |
| 7,251,889 B2 | 8/2007 | Kroliczek et al. |
| 7,253,587 B2 | 8/2007 | Meissner |
| 7,264,902 B2 | 9/2007 | Horie et al. |
| 7,304,453 B2 * | 12/2007 | Eaves ............... 320/120 |
| 7,315,789 B2 | 1/2008 | Plett |
| 7,321,220 B2 | 1/2008 | Plett |
| 7,327,147 B2 | 2/2008 | Koch |
| 7,400,115 B2 | 7/2008 | Plett |
| 7,446,504 B2 | 11/2008 | Plett |
| 7,479,758 B2 | 1/2009 | Moon |
| 7,518,339 B2 | 4/2009 | Schoch |
| 7,521,895 B2 | 4/2009 | Plett |
| 7,525,285 B2 | 4/2009 | Plett |
| 7,583,059 B2 | 9/2009 | Cho |
| 7,589,532 B2 | 9/2009 | Plett |
| 7,656,122 B2 | 2/2010 | Plett |
| 7,723,957 B2 | 5/2010 | Plett |
| 7,794,868 B2 | 9/2010 | Yang |
| 7,883,793 B2 | 2/2011 | Niedzwiecki et al. |
| 2001/0046624 A1 | 11/2001 | Goto et al. |
| 2003/0082440 A1 | 5/2003 | Mrotek et al. |
| 2003/0184307 A1 | 10/2003 | Kozlowski et al. |
| 2005/0026014 A1 | 2/2005 | Fogaing et al. |
| 2005/0100786 A1 | 5/2005 | Ryu et al. |
| 2005/0127874 A1 | 6/2005 | Lim et al. |
| 2005/0134038 A1 | 6/2005 | Walsh |
| 2006/0100833 A1 | 5/2006 | Plett |
| 2007/0037051 A1 | 2/2007 | Kim et al. |
| 2007/0087266 A1 | 4/2007 | Bourke et al. |
| 2009/0029239 A1 | 1/2009 | Koetting et al. |
| 2009/0186265 A1 | 7/2009 | Koetting et al. |
| 2009/0325051 A1 | 12/2009 | Niedzwiecki et al. |
| 2009/0325052 A1 | 12/2009 | Koetting et al. |
| 2009/0325053 A1 | 12/2009 | Koetting et al. |
| 2009/0325054 A1 | 12/2009 | Payne et al. |
| 2009/0325055 A1 | 12/2009 | Koetting et al. |
| 2010/0086842 A1 | 4/2010 | Yang |
| 2010/0266883 A1 | 10/2010 | Koetting et al. |
| 2010/0275619 A1 | 11/2010 | Koetting et al. |
| 2010/0276132 A1 | 11/2010 | Payne |
| 2010/0279152 A1 | 11/2010 | Payne |
| 2010/0279153 A1 | 11/2010 | Payne |
| 2010/0279154 A1 | 11/2010 | Koetting et al. |
| 2011/0027625 A1 | 2/2011 | Payne |
| 2011/0027640 A1 | 2/2011 | Gadawski et al. |
| 2011/0052959 A1 | 3/2011 | Koetting et al. |

FOREIGN PATENT DOCUMENTS

| | | |
|---|---|---|
| EP | 0736226 B1 | 3/1999 |
| EP | 0673553 B1 | 2/2001 |
| EP | 1435675 A1 | 7/2004 |
| JP | 4056079 A | 2/1992 |
| JP | 8138735 A | 5/1996 |
| JP | 8222280 A | 8/1996 |
| JP | 9129213 A | 5/1997 |
| JP | 09-219213 | 8/1997 |
| JP | 10199510 A | 7/1998 |
| JP | 11066949 A | 3/1999 |
| JP | 11191432 A | 7/1999 |
| JP | 2003219572 A | 7/2003 |
| JP | 2005-126315 | 5/2005 |
| JP | 2008-080995 | 4/2008 |
| KR | 100765659 B1 | 10/2007 |
| KR | 20080047641 A | 5/2008 |
| KR | 100889241 B1 | 3/2009 |
| KR | 100921346 B1 | 10/2009 |
| WO | WO03/071616 A2 | 8/2003 |

OTHER PUBLICATIONS

European Supplementary Search Report dated Aug. 28, 2009 for EP Application No. 04774658.

International Search Report for International application No. PCT/KR2005/003755 dated Mar. 2, 2006.

International Search Report for PCT/KR2009/000258 dated Aug. 28, 2009.

International Search report for PCT/KR2009/003434 dated Jan. 18, 2010.

Machine translation of JP 08-138735.

Machine translation of JP 10-199510.

Machine translation of JP 2000 260469.

U.S. Appl. No. 12/794,949, filed Jun. 7, 2010 entitled Battery Module and Methods for Bonding a Cell Terminal of a Battery to an Interconnect Member.

U.S. Appl. No. 12/857,908, filed Aug. 17, 2010 entitled Battery Cell Assemblies.

U.S. Appl. No. 12/861,364, filed Aug. 23, 2010 entitled Connecting Assembly.

U.S. Appl. No. 12/861,375, filed Aug. 23, 2010 entitled attery System and Manifold Assembly Having a Manifold Member and a Connecting Fitting.

U.S. Appl. No. 12/861,381, filed Aug. 23, 2010 entitled End Cap.

U.S. Appl. No. 12/861,394, filed Aug. 23, 2010 entitled Battery System and Manifold Assembly With Two Manifold Members Removably Coupled Together.

U.S. Appl. No. 12/868,111, filed Aug. 25, 2010 entitled Battery Module and Methods for Bonding Cell Terminals of Battery Cells Together.

* cited by examiner

US 8,288,031 B1

BATTERY DISCONNECT UNIT AND METHOD OF ASSEMBLING THE BATTERY DISCONNECT UNIT

BACKGROUND

A battery electrical system that can disconnect a battery from a hybrid vehicle powertrain has been utilized. However, the battery electrical system has individual distinct wires coupled to each component and is extremely time consuming to assemble and is prone to assembly errors.

Accordingly, the inventors herein have recognized a need for an improved battery disconnect unit that reduces and/or minimizes the above-mentioned deficiencies.

SUMMARY

A battery disconnect unit for selectively coupling a battery pack to a load in accordance with an exemplary embodiment is provided. The battery disconnect unit includes a base portion configured to hold first and second contactors, a pre-charging relay, and a charging relay, thereon. The battery disconnect unit further includes a circuit board having first, second, third, and fourth bus bars coupled thereto extending outwardly from the circuit board. The first and second bus bars are coupled to first and second terminals, respectively, of the first contactor. The first bus bar is further configured to be coupled to the battery pack. The second bus bar is further configured to be coupled to the load. The third and fourth bus bars are coupled to third and fourth terminals, respectively, of the second contactor. The third bus bar is further configured to be coupled to the battery pack, and the fourth bus bar is further configured to be coupled to the load.

A method for assembling a battery disconnect unit in accordance with another exemplary embodiment is provided. The method includes disposing first and second contactors, a pre-charging relay, and a charging relay, on a base portion. The method further includes disposing a circuit board having first, second, third and fourth bus bars, above the base portion. The method further includes coupling the first and second bus bars to first and second terminals, respectively, of the first contactor. The method further includes coupling the third and fourth bus bars to first and second terminals, respectively, of the second contactor. The method further includes coupling a cover portion to the base portion such that the first and second contactors, the charging relay, and the circuit board are disposed between the base portion and the cover portion.

DETAILED DESCRIPTION

Figure 1:
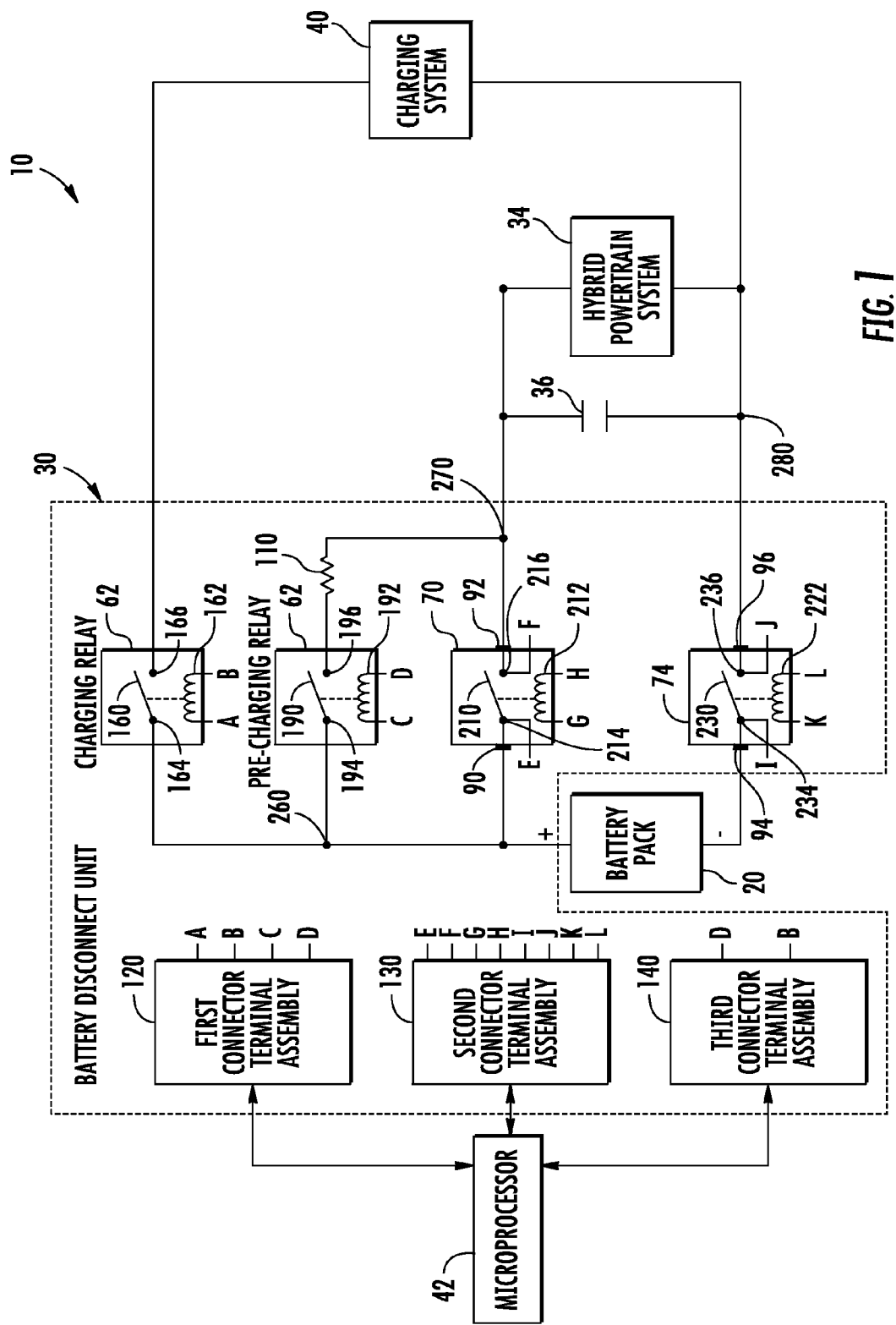
FIG. 1 is a schematic of a hybrid vehicle having a battery disconnect unit in accordance with an exemplary embodiment.
Figure 2:
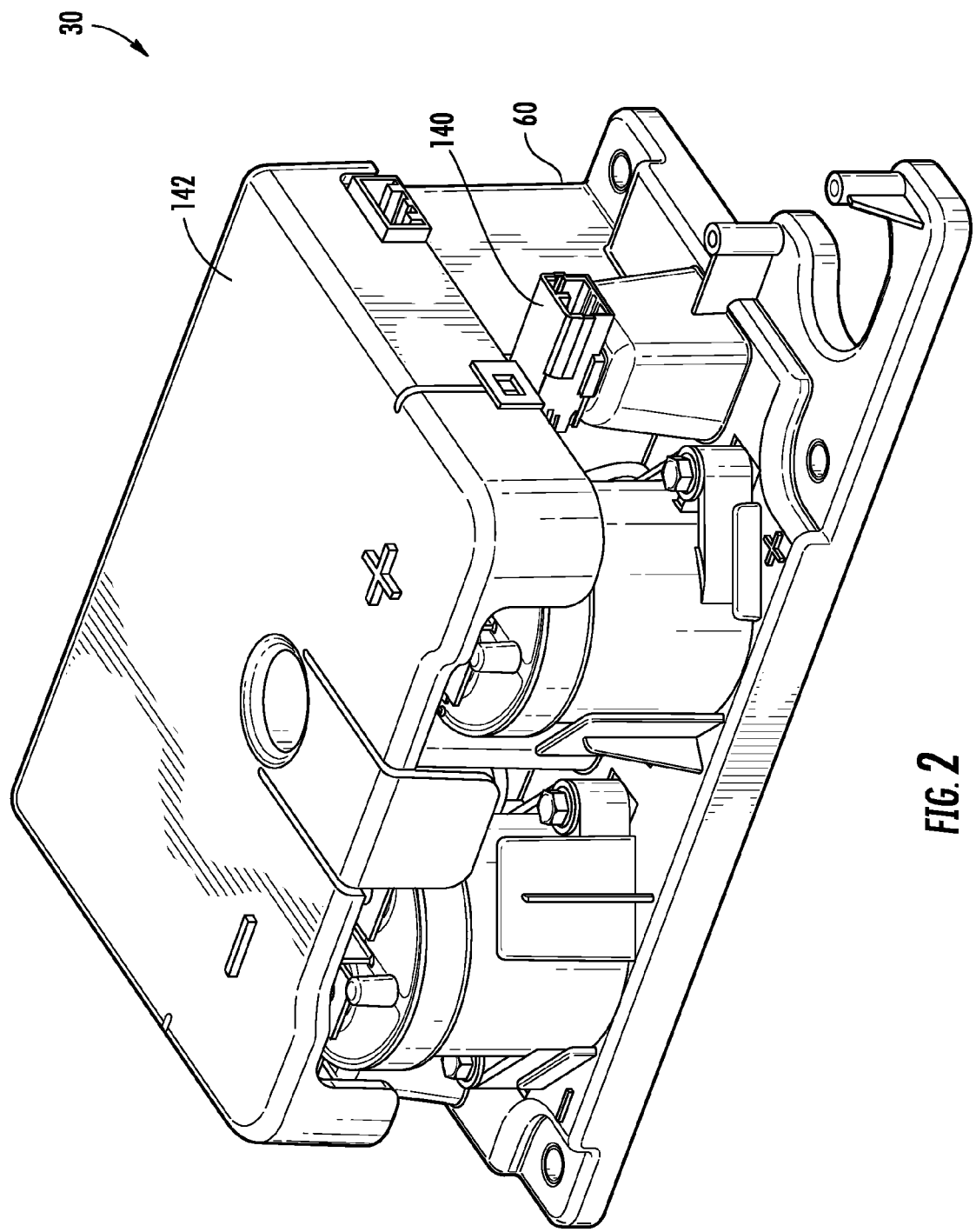
FIG. 2 is an isometric view of the battery disconnect unit of FIG. 1.

Referring to FIGS. 1 and 2, a hybrid vehicle 10 having a battery disconnect unit 30 in accordance with an exemplary embodiment is provided. The hybrid vehicle 10 includes a battery pack 20, the battery disconnect unit 30, the hybrid powertrain system 34, a capacitor 36, a charging system 450, and a microprocessor 42. For purposes of understanding, the term load used herein refers to an electrical load. For example, a load can include at least one of the capacitor 36 and the hybrid powertrain system 34.

The battery pack 20 is configured to output an operational voltage for the hybrid powertrain system 34. In one exemplary embodiment, the battery pack 20 includes a plurality of lithium-ion battery modules coupled together in series or in parallel to one another. Of course, in alternative embodiment, other types of battery modules could be utilized in the battery pack 20, as known to those skilled in the art.

The battery disconnect unit 30 is configured to selectively electrically couple the battery pack 20 to the hybrid powertrain system 34 which is an electrical load. The battery disconnect unit 30 includes a base portion 60, a charging relay 62, a pre-charging relay 64, first and second contactors 70, 74, a circuit board 80, first, second, third, fourth bus bars 90, 92, 94, 96, a pre-charging resistor 110, first, second, and third connector terminal assemblies 120, 130, 140, and a cover portion 142.

The base portion 60 is configured to hold the charging relay 62, the pre-charging relay 64, the first and second contactors 70, 74, and the circuit board 80 thereon. In one exemplary embodiment, the base portion 60 is constructed of plastic. Also, the base portion 60 may be attached to the charging relay 62, the pre-charging relay 64, and the first and second contactors 70, 74 utilizing screws or bolts. Of course, other attachment devices are contemplated in alternative embodiments.

Figure 3:
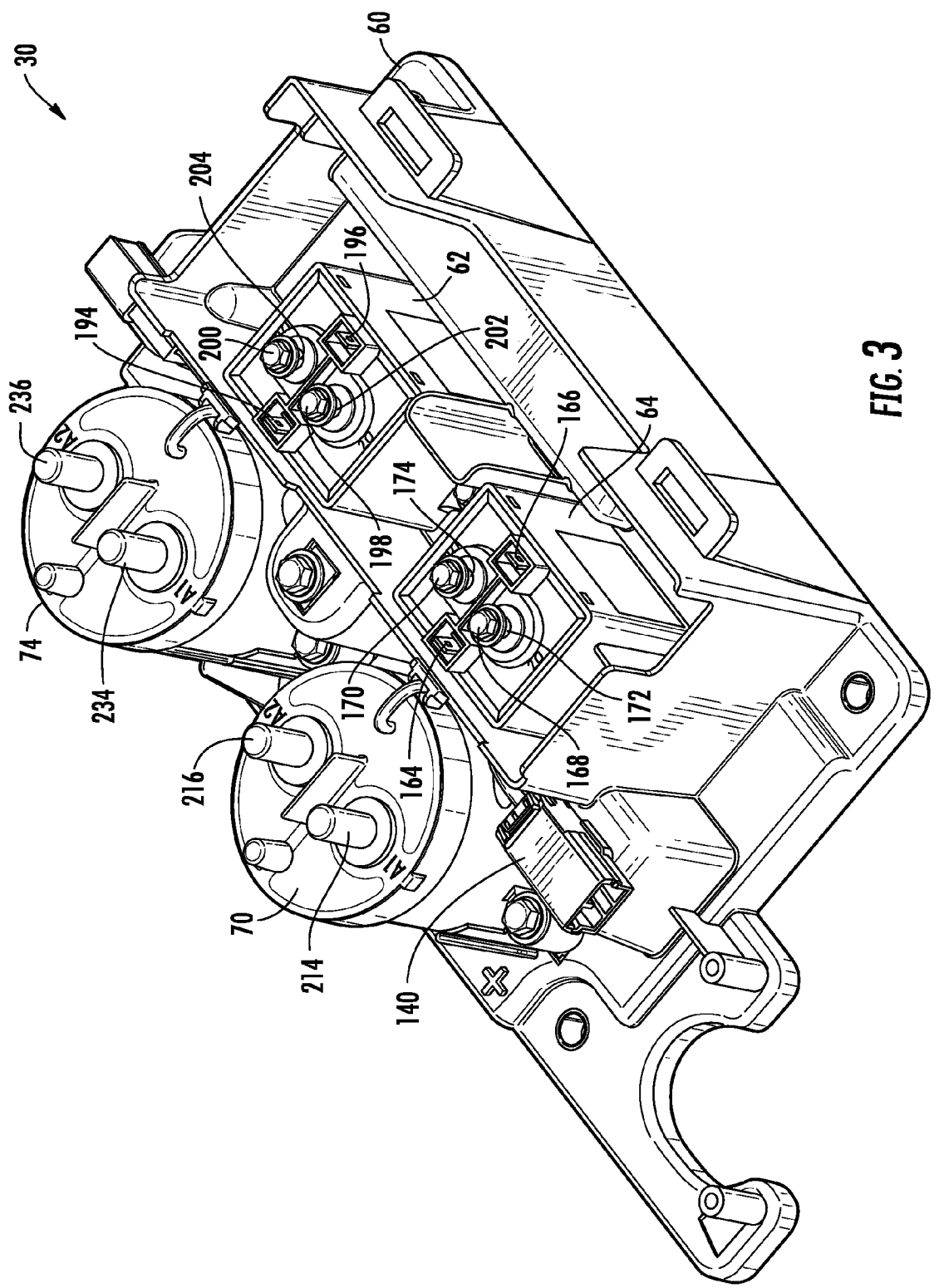
FIG. 3 is another isometric view of a portion of the battery disconnect unit of FIG. 1.
Figure 4:
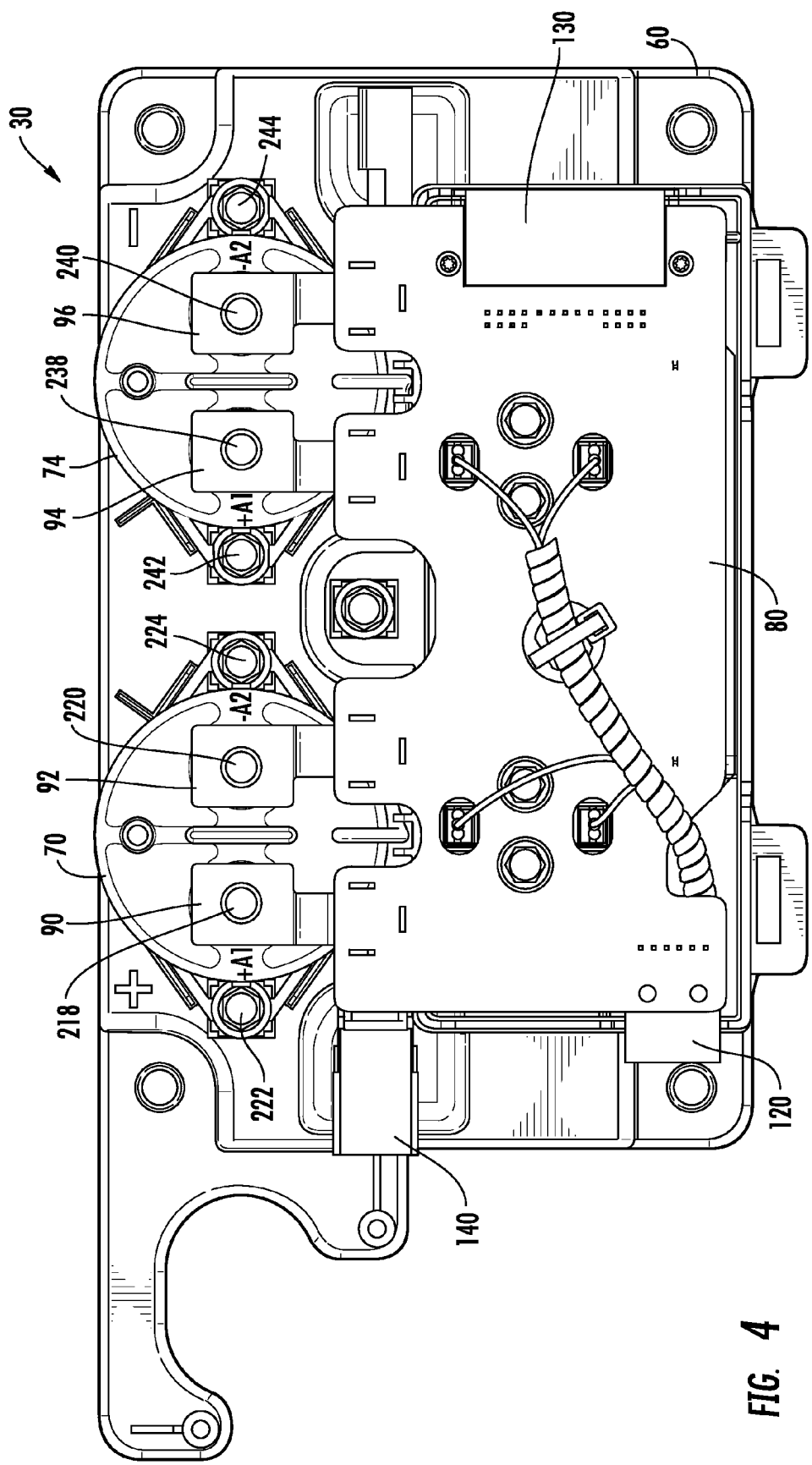
FIG. 4 is a top view of a portion of the battery disconnect unit of FIG. 1.
Figure 5:
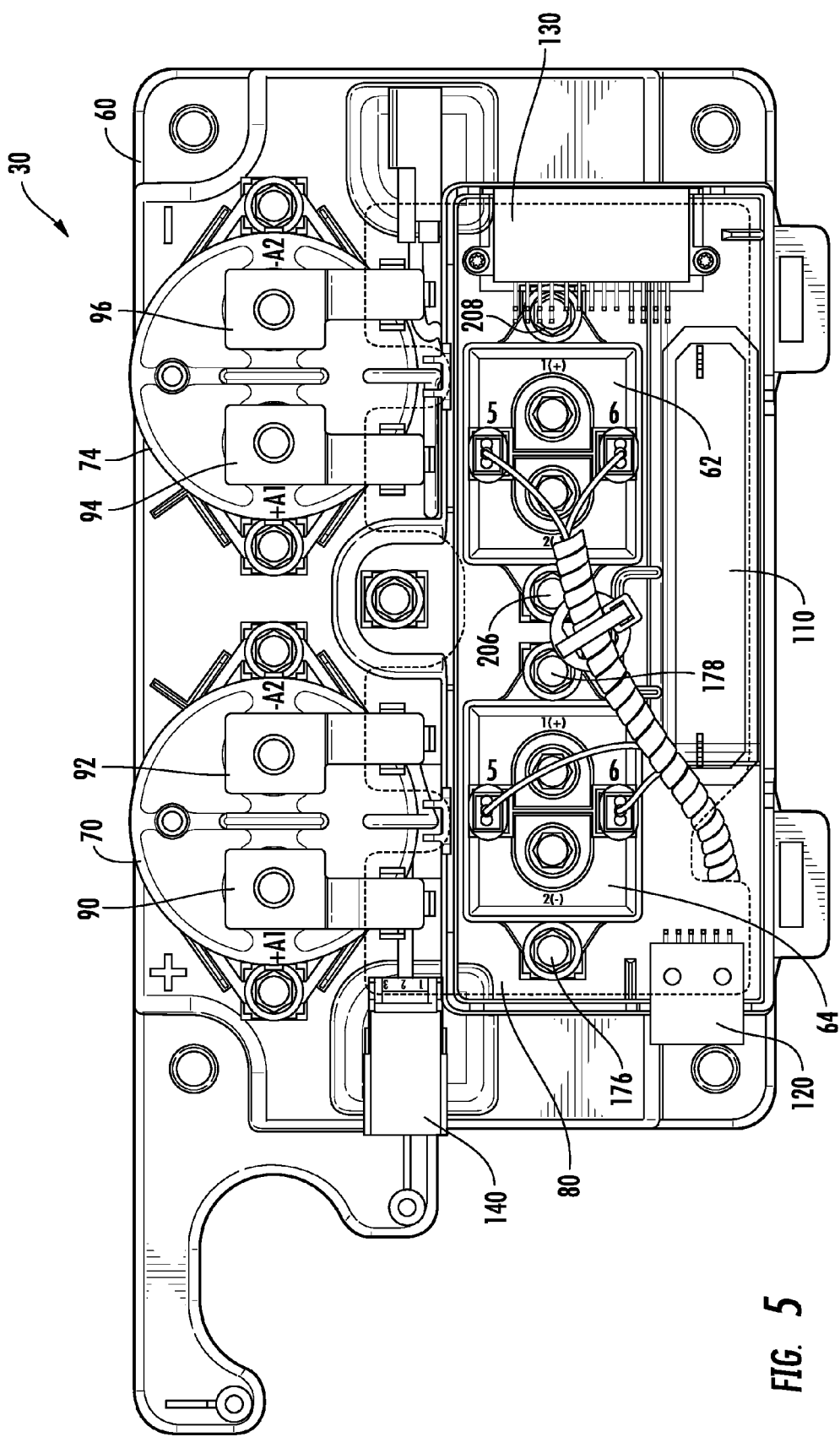
FIG. 5 is another top view of a portion of the battery disconnect unit of FIG. 1.
Figure 6:
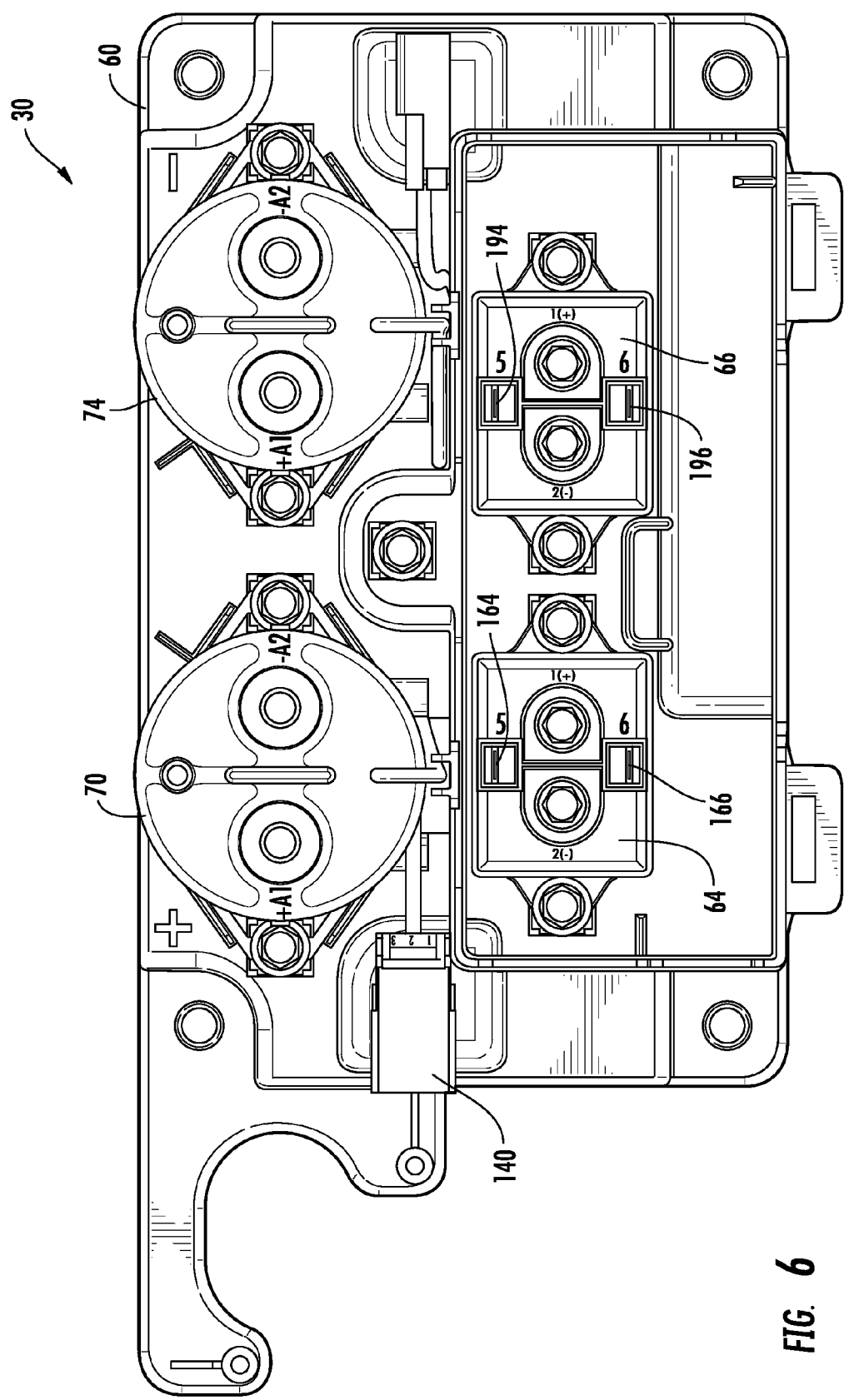
FIG. 6 is another top view of a portion of the battery disconnect unit of FIG. 1.
Figure 7:
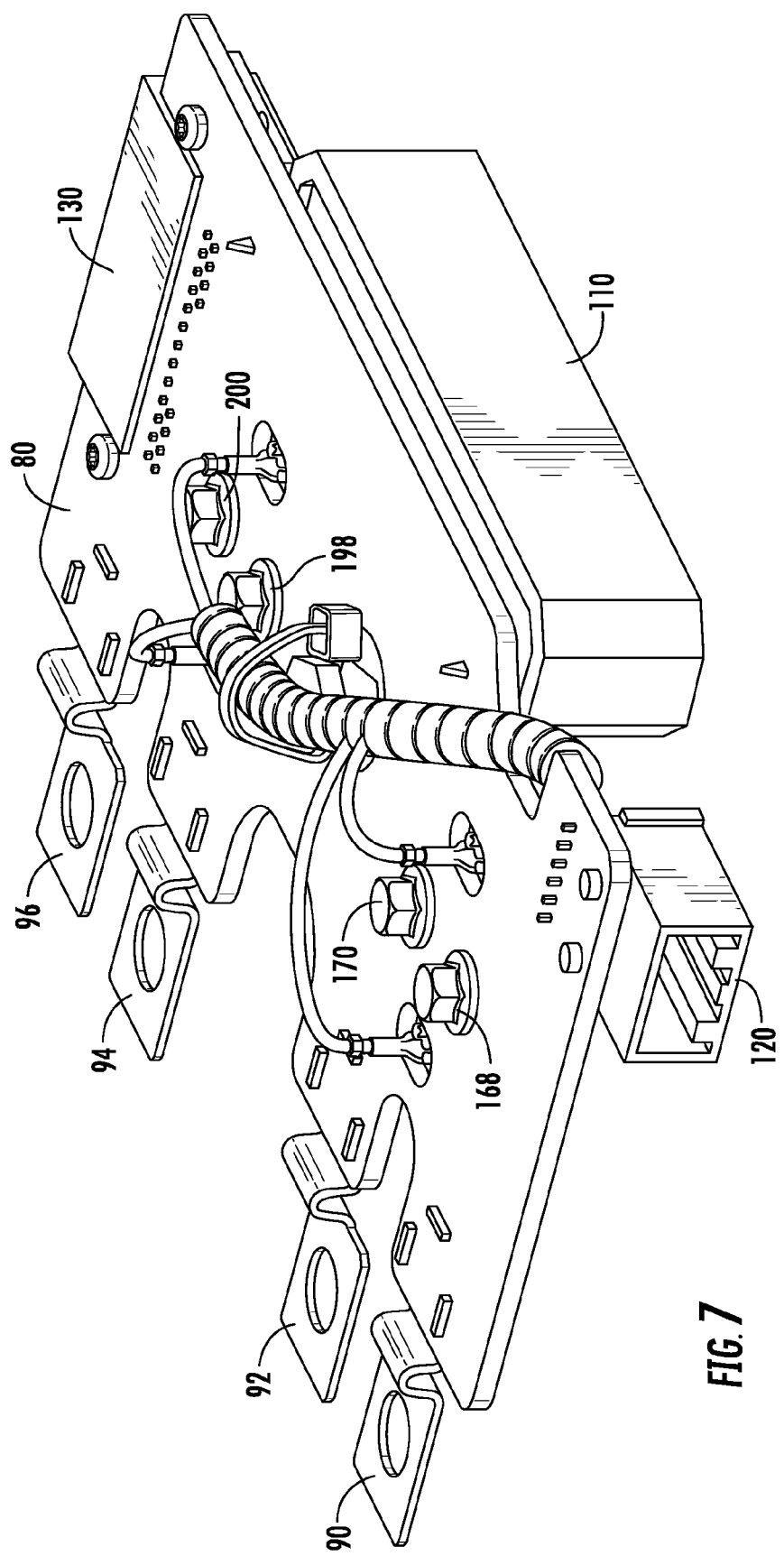
FIG. 7 is an isometric view of a circuit board utilized in the battery disconnect unit of FIG. 4.

Referring to FIGS. 1 and 3-6, the charging relay 62 is electrically coupled between the charging system 40 and the battery pack 20. The charging relay 62 includes a charging relay switch 160, a charging relay coil 162, first and second charging relay terminals 164, 166, nuts 168, 170, and shafts 172, 174. The charging relay coil 162 induces the charging relay switch 160 to have a closed operational position in response to the charging relay coil 162 receiving a control signal from the microprocessor 42. When the microprocessor 42 removes the control signal from the coil 162, the switch 160 has an open operational position. In one exemplary embodiment, the charging relay switch 160 has a current capacity of 40 Amps. Of course in an alternative embodiment, the charging relay switch 160 could have a current capacity less than 40 Amps or greater than 40 Amps. The first charging relay terminal 164 is electrically coupled to the node 260 which is further electrically coupled to a positive voltage terminal of the battery pack 20. The second charging relay terminal 166 is electrically coupled to the charging system 40. Referring to FIGS. 3, 5 and 7, the nut 168 is utilized to couple the shaft 172 to the circuit board 80. The nut 174 is utilized to couple the shaft 174 to the circuit board 80. The charging relay 62 is coupled to the base portion 60 utilizing screws 176, 178.

Referring to FIGS. 1 and 3-6, the pre-charging relay 64 is electrically coupled between the battery pack 20 and the hybrid power train system 34. The node 260 is electrically coupled to a positive voltage terminal of the battery pack 20 and a node 270 is electrically coupled to the hybrid power train system 34. The pre-charging relay 64 includes a pre-charging relay switch 190, a pre-charging relay coil 192, first and second pre-charging relay terminals 194, 196, nuts 198, 200, and shafts 202, 204. The pre-charging relay coil 192 induces the pre-charging relay switch 190 to have a closed operational position in response to the pre-charging relay coil 192 receiving a control signal from the microprocessor 42. When the microprocessor 42 removes the control signal from the coil 192, the switch 190 has an open operational position. In one exemplary embodiment, the pre-charging relay switch 190 has a current capacity of 15 Amps. Of course in an alternative embodiment, the pre-charging relay switch 190 could have a current capacity less than 15 Amps or greater than 15 Amps. The first pre-charging relay terminal 194 is electrically coupled to the node 260 that is further electrically coupled to a positive voltage terminal of the battery pack 20. The second pre-charging relay terminal 196 is electrically coupled in series with the pre-charging resistor 110, which is coupled to the node 270 which is further electrically coupled to the hybrid powertrain system 34. Referring to FIGS. 3, 5 and 7, the nut 198 is utilized to couple the shaft 202 to the circuit board 80. The nut 200 is utilized to couple the shaft 204 to the circuit board 80. The pre-charging relay 64 is coupled to the base portion 60 utilizing screws 206, 208.

Referring to FIGS. 1 and 3-6, the first contactor 70 is electrically coupled between a positive voltage terminal of the battery pack 20 and the hybrid power train system 34. The first contactor 70 includes a first contactor switch 210, a first contactor coil 212, first and second terminals 214, 216, and nuts 218, 220. The first contactor coil 212 induces the first contactor switch 210 to have a closed operational position in response to the first contactor coil 212 receiving a control signal from the microprocessor 42. When the microprocessor 42 removes the control signal from the coil 212, the switch 210 has an open operational position. The first terminal 214 is electrically coupled to the node 260 and to the battery pack 20 via the first bus bar 90. The second terminal 216 is electrically coupled to the node 270 and to the hybrid power train system 34 via the second bus bar 92. Referring to FIGS. 3, 5 and 7, the nut 218 is utilized to couple the first terminal 214 to the first bus bar 90, and the nut 220 is utilized to couple the second terminal 216 to the second bus bar 92. The screws 222, 224 are utilized to couple the first contactor 70 to the base portion 60. In one exemplary embodiment, the first contactor switch 210 has a current capacity of 500 Amps. Of course in an alternative embodiment, the first contactor switch 210 could have a current capacity less than 500 Amps or greater than 500 Amps.

Referring to FIGS. 1 and 3-6, the second contactor 74 is electrically coupled between a negative voltage terminal of the battery pack 20 and the hybrid power train system 34. The second contactor 74 includes a second contactor switch 230, a second contactor coil 232, first and second terminals 234, 236, and nuts 238, 240. The second contactor coil 232 induces the second contactor switch 230 to have a closed operational position in response to the second contactor coil 232 receiving a control signal from the microprocessor 42. When the microprocessor 42 removes the control signal from the coil 232, the switch 230 has an open operational position. The first terminal 234 is electrically coupled to the node 260 and to the battery pack 20 via the third bus bar 94. The second terminal 236 is electrically coupled to the node 270 and to the hybrid power train system 34 via the fourth bus bar 96. Referring to FIGS. 3, 5, and 7, the nut 238 is utilized to couple the first terminal 234 to the third bus bar 94, and the nut 240 is utilized to couple the second terminal 236 to the fourth bus bar 96. The screws 242, 244 are utilized to couple the second contactor 74 to the base portion 60. In one exemplary embodiment, the second contactor switch 230 has a current capacity of 500 Amps. Of course in an alternative embodiment, the second contactor switch 230 could have a current capacity less than 500 Amps or greater than 500 Amps.

Referring to FIGS. 1 and 7, the circuit board 80 is configured to hold the first, second, third, fourth bus bars 90, 92, 94, 96, the pre-charging resistor 110, and the first and second connector terminal assemblies 120, 130 on a first side thereof. The bus bars 90, 92, 94, 96 have tabs extending through the circuit board and are soldered to electrical traces on the circuit board 80. In an exemplary embodiment, the bus bars 90, 94, 94, 96 extend outwardly from the circuit board 80 for coupling to terminals of the contactors that are not disposed directly underneath the circuit board 80. Further, the first, second, third, fourth bus bars 90, 92, 94, 96 have apertures 290, 292, 294, 296, respectively, that are configured to receive the terminals 214, 216, 234, 236, respectively, therethrough. In one exemplary embodiment, the first, second, third, fourth bus bars 90, 92, 94, 96 are constructed of copper. Of course, in alternative embodiment, the bus bars could be constructed of other conductive materials known to those skilled in the art. In one exemplary embodiment, the pre-charging resistor 110 has a resistance value of 25 Ohms and a current capacity of 2 Amps. Of course, in an alternative embodiment, the pre-charging resistor 110 could have a resistance greater than 25 Ohms or less than 25 Ohms. Also, the pre-charging resistor 110 could have a current capacity greater than 2 Amps or less than 2 Amps. Further, in an alternative embodiment, the pre-charging resistor 110 could be disposed at another location off of the circuit board 80. It is also noted that the components on the circuit board 80 may vary based on the functional and electrical requirements of the charging system 40 or the hybrid powertrain system 34.

Referring to FIGS. 1 and 5, the first connector terminal assembly 120 is electrically coupled to the charging relay coil 162 and the pre-charging relay coil 192. The first connector terminal assembly 120 is further electrically coupled to the microprocessor 42 that generates control signals for energizing the charging relay coil 162 and the pre-charging relay coil 192, via the first connector terminal assembly 120.

The second connector terminal assembly 130 is electrically coupled to the first and second terminals 214, 216 of the first contactor 70, the first contactor coil 212, the first and second terminals 214, 216 of the second contactor 74, and the second contactor coil 232. The second connector terminal assembly 130 is further electrically coupled to the microprocessor 42 that generates control signals for energizing the first and second contactor coils 212, 232 via the second connector terminal assembly 130. The microprocessor 42 can also perform diagnostics on the contactors 70, 74 by measuring a voltage across the first and second terminals 214, 216 of the first contactor 70, and a voltage across the first and second terminals 214, 216 of the second contactor 74 via the second connector terminal assembly 130.

The third connector terminal assembly 140 is coupled to the base portion 60. The third connector terminal assembly 140 is electrically coupled to the charging relay coil 162 and the pre-charging relay coil 192. The third connector terminal assembly 140 is further electrically coupled to the microprocessor 42. The microprocessor 42 can also perform diagnostics on the charging relay coil 162 and the pre-charging relay coil 192 by measuring a voltage at the charging relay coil 162, and a voltage at the pre-charging relay coil 192, via the third connector terminal assembly 140.

Referring to FIG. 2, the cover portion 142 is configured to be selectively coupled to the base portion 60 such that the remaining components of the battery disconnect unit 30 are disposed between the base portion 60 and the cover portion 142. In one exemplary embodiment, the cover portion 142 is constructed of plastic.

Referring to FIG. 1, the hybrid powertrain system 34 is electrically coupled between the nodes 270, 280 and the electrical contactors 70, 74. When the contactors 70, 72 have a closed operational position, the battery pack 20 is electrically connected to the hybrid powertrain system 34 and an operational voltage from the battery pack 20 is applied to the hybrid powertrain system 34. When at least one of the contactors 70, 72 has an open operational position, an operational voltage from the battery pack 20 is removed from the hybrid powertrain system 34.

The capacitor 36 is coupled between the nodes 270, 280 and is electrically coupled in parallel with the hybrid powertrain system 34. The capacitor 36 is also a portion of the electrical load.

During operation, the microprocessor 42 generates control signals to induce the pre-charging relay 64 to have a closed operational position and the contactor 70 to have a closed operational position to apply an operational voltage to the capacitor 36 to charge the capacitor 36. Thereafter, the microprocessor 42 generates control signals to induce both the contactors 70, 72 to have a closed operational position, when the pre-charging relay 64 has an open operational position, to connect the battery pack 20 to the hybrid powertrain system 34 such that an operational voltage from the battery pack 20 is applied to the hybrid powertrain system 34. When the microprocessor 42 determines to remove the operational voltage from the hybrid powertrain system 34, the microprocessor 42 removes the control signals from the coils of the contactors 70, 72 to induce the contactors 70, 72 to have open operational positions to disconnect the battery pack 20 from the hybrid powertrain system 34. When the microprocessor 42 determines that the battery pack 20 needs to be charged by the charging system 40, the microprocessor 42 generates control signals to induce the charging relay 62 and the contactor 74 to have closed operational positions to apply an operational voltage from the charging system 40 to the battery pack 20.

Figure 8:
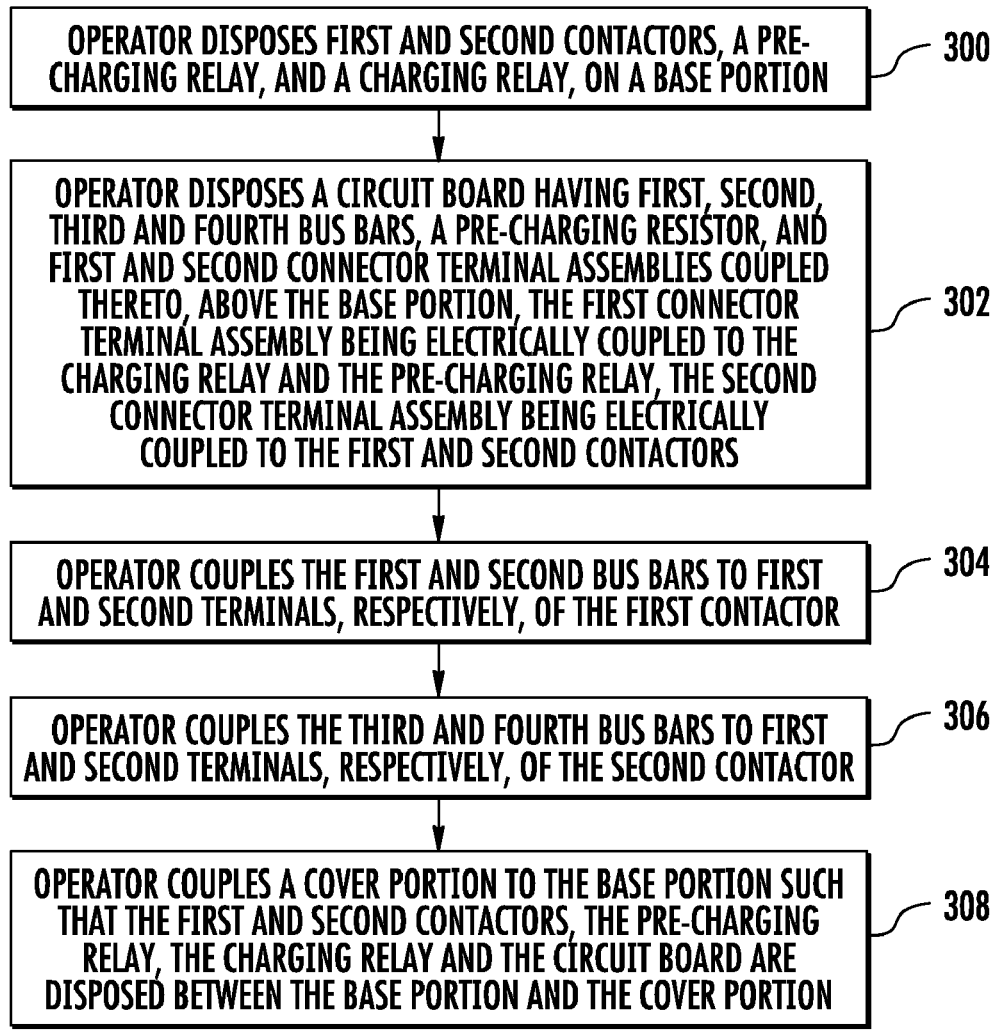
FIG. 8 is a flowchart of a method for assembling the battery disconnect unit of FIG. 1 in accordance with another exemplary embodiment.

Referring to FIG. 8, a flowchart of method for assembling the battery disconnect unit 30 in accordance with another exemplary embodiment is illustrated.

At step 300, an operator disposes the first and second contactors 70, 74, the pre-charging relay 64, and the charging relay 62, on the base portion 60.

At step 302, the operator disposes the circuit board 80 having first, second, third and fourth bus bars 90, 92, 94, 95, the pre-charging resistor 110, and first and second connector terminal assemblies 120, 130 coupled thereto, above the base portion 60. The first connector terminal assembly 120 is electrically coupled to the charging relay 62 and to the pre-charging relay 64. The second connector terminal assembly 130 is electrically coupled to the first and second contactors 70, 74.

At step 304, the operator couples the first and second bus bars 90, 92 to first and second terminals 214, 216, respectively, of the first contactor 70.

At step 306, the operator couples the third and fourth bus bars 94, 96 to first and second terminals 234, 236, respectively, of the second contactor 74.

At step 308, the operator couples the cover portion 142 to the base portion 60 such that the first and second contactors 70, 74, the pre-charging relay 64, the charging relay 62 and the circuit board 80 are disposed between the base portion 60 and the cover portion 142.

The battery disconnect unit 30 and the method of assembly of the unit 30 provide a substantial advantage over other units and methods. In particular, the battery disconnect unit 30 provides a technical effect of utilizing a circuit board having first, second, third, and fourth bus bars, and a pre-charging resistor disposed thereon that greatly simplifies the assembly of the battery disconnect unit 30 as compared with other units and methods, and reduces assembly errors.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

We claim:

1. A battery disconnect unit for selectively coupling a battery pack to a load, comprising:
   a base portion configured to hold first and second contactors, a pre-charging relay, and a charging relay, thereon;
   a circuit board having first, second, third, and fourth bus bars coupled thereto extending outwardly from the circuit board;
   the first and second bus bars being coupled to first and second terminals, respectively, of the first contactor, the first bus bar further configured to be electrically coupled to a first voltage terminal of the battery pack, the second bus bar further configured to be electrically coupled to a first end of the load;
   the third and fourth bus bars being coupled to first and second terminals, respectively, of the second contactor, the third bus bar further configured to be electrically coupled to a second voltage terminal of the battery pack, the fourth bus bar further configured to be electrically coupled to a second end of the load; and
   the circuit board further includes a pre-charging resistor disposed thereon, the pre-charging relay and the pre-charging resistor being coupled in series with one another, and further coupled in parallel to the first contactor, such that a first control signal induces the pre-charging relay to electrically couple the first voltage terminal of the battery pack through the pre-charging resistor to the first end of the load, and a second control signal induces the second contactor to electrically couple the second voltage terminal of the battery pack to the second end of the load, for pre-charging the load.

2. The battery disconnect unit of claim 1, wherein a third control signal induces the first contactor to electrically couple the first voltage terminal of the battery pack to the first end of the load to energize the load.

3. The battery disconnect unit of claim 1, wherein the circuit board further includes first and second connector terminal assemblies coupled thereto.

4. The battery disconnect unit of claim 3, wherein the first connector terminal assembly is electrically coupled to a pre-charging relay coil in the pre-charging relay, and the first connector terminal assembly is further electrically coupled to a charging relay coil in the charging relay.

5. The battery disconnect unit of claim 3, wherein the second connector terminal assembly is electrically coupled to a first contactor coil of the first contactor, and the second connector terminal assembly is further electrically coupled to a second contactor coil of the second contactor.

6. The battery disconnect unit of claim 1, further comprising a cover portion configured to be attached to the base portion.

7. A method for assembling a battery disconnect unit, comprising:
- disposing first and second contactors, a pre-charging relay, and a charging relay, on a base portion;
- disposing a circuit board having first, second, third and fourth bus bars, above the base portion;
- coupling the first bus bar to a first terminal of the first contactor such that the first terminal of the first contactor is configured to be electrically coupled to a first voltage terminal of a battery pack utilizing the first bus bar;
- coupling the second bus bar to a second terminal of the first contactor such that the second terminal of the first contactor is configured to be electrically coupled to a first end of a load utilizing the second bus bar;
- coupling the third bus bar to a first terminal of the second contactor such that the first terminal of the second contactor is configured to be electrically coupled to a second voltage terminal of the battery pack utilizing the third bus bar;
- coupling the fourth bus bar to a second terminal of the second contactor such that the second terminal of the second contactor is configured to be electrically coupled to a second end of the load utilizing the fourth bar; and
- coupling a cover portion to the base portion such that the first and second contactors, the charging relay, and the circuit board are disposed between the base portion and the cover portion, further comprising coupling the pre-charging relay and a pre-charging resistor in series with one another, and further coupling the pre-charging relay and the pre-charging resistor in parallel to the first contactor, such that a first control signal induces the pre-charging relay to electrically couple the first voltage terminal of the battery pack through the pre-charging resistor to the first end of the load, and a second control signal induces the second contactor to electrically couple the second voltage terminal of the battery pack to the second end of the load, for pre-charging the load.

8. A battery disconnect unit for selectively coupling a battery pack to a load, comprising:
- a base portion configured to hold first and second contactors, a pre-charging relay, and a charging relay, thereon;
- a circuit board having first, second, third, and fourth bus bars coupled thereto extending outwardly from the circuit board;
- the first and second bus bars being coupled to first and second terminals, respectively, of the first contactor, the first bus bar further configured to be electrically coupled to a first voltage terminal of the battery pack, the second bus bar further configured to be electrically coupled to a first end of the load;
- the third and fourth bus bars being coupled to first and second terminals, respectively, of the second contactor, the third bus bar further configured to be electrically coupled to a second voltage terminal of the battery pack, the fourth bus bar further configured to be electrically coupled to a second end of the load; and
- a pre-charging resistor electrically coupled in series with the pre-charging relay, the pre-charging resistor and the pre-charging relay being further electrically coupled in parallel to the first contactor, such that a first control signal induces the pre-charging relay to electrically couple the first voltage terminal of the battery pack through the pre-charging resistor to the first end of the load, and a second control signal induces the second contactor to electrically couple the second voltage terminal of the battery pack to the second end of the load, for pre-charging the load.

9. The battery disconnect unit of claim 8, wherein a third control signal induces the first contactor to electrically couple the first voltage terminal of the battery pack to the first end of the load to energize the load.

10. The battery disconnect unit of claim 8, wherein the circuit board further includes first and second connector terminal assemblies coupled thereto.

11. The battery disconnect unit of claim 10, wherein the first connector terminal assembly is electrically coupled to a pre-charging relay coil in the pre-charging relay, and the first connector terminal assembly is further electrically coupled to a charging relay coil in the charging relay.

12. The battery disconnect unit of claim 11, wherein the second connector terminal assembly is electrically coupled to a first contactor coil of the first contactor, and the second connector terminal assembly is further electrically coupled to a second contactor coil of the second contactor.

13. The battery disconnect unit of claim 8, further comprising a cover portion configured to be attached to the base portion.

\* \* \* \* \*